United States Patent [19]

Heikkilä et al.

[11] 3,966,019

[45] June 29, 1976

[54] LUBRICATING SYSTEM OF PRESSURE FLUID OPERATED ROCK DRILL MACHINES

[75] Inventors: Viekko Heikkilä; Leo Häkkinen; Rolf Ström; Leo Uusitalo; Juha Mellin, all of Tampere, Finland

[73] Assignee: OY Tampella AB Mechanical Workshops, Tampere, Finland

[22] Filed: June 13, 1975

[21] Appl. No.: 586,996

[30] Foreign Application Priority Data

June 18, 1974 Finland .............................. 1867/74

[52] U.S. Cl. ............................ 184/7 D; 173/DIG. 2

[51] Int. Cl.$^2$ ............................................ F16N 7/14

[58] Field of Search ................ 184/1 R, 6, 7 R, 7 D, 184/7 E, 7 F, 6.28, 14; 173/DIG. 2, 112, 152; 74/467

[56] References Cited

UNITED STATES PATENTS 2,288,075 6/1942 Edwards ............................ 173/112

3,113,628 12/1963 Orcutt ................................ 173/152

3,487,892 1/1970 Kiefer ................................. 184/7 D 3,664,462 5/1972 Smith .................................. 184/7 D

FOREIGN PATENTS OR APPLICATIONS 1,069,963 11/1959 Germany ........................... 184/7 D

*Primary Examiner*—Richard C. Pinkham

*Assistant Examiner*—Marvin Siskind

*Attorney, Agent, or Firm*—Hauke & Patalidis

[57] ABSTRACT

A lubrication system for rock drill machines powered by pressurized fluid, the lubricating system comprising a reservoir of lubricant, means for pressurizing the lubricant in the reservoir, conduits for feeding lubricant from the reservoir to individual dosage units, each connected to a particular lubrication point of the rock drill machine, the lubricant being supplied under pressure from the dosage unit by way of a rod- or plunger-operated piston reciprocable in the dosage unit, the end of the piston rod engaging an adjustable abutment, the dosage units being mounted such as to be reciprocable in unison with the rock drill by way of the drill feed unit.

7 Claims, 4 Drawing Figures

LUBRICATING SYSTEM OF PRESSURE FLUID OPERATED ROCK DRILL MACHINES

BACKGROUND OF THE INVENTION

The present invention relates to a lubricating system for rock drill machines driven by pressurized fluid, comprising a lubricant reservoir, passages for conducting the lubricant to the lubrication points and means for feeding lubricant into said passages.

Oil mist lubrication is a typical feature in the design of compressed air driven rock drills. In that case the compressed air constituting the driving power is either conducted through mist generators or the lubricant is dosed into the compressed air system. The greatest drawback of this system of the prior art is that the compressed air, and the lubricant along with it, finds the path of least resistance through the drill machine, whereby the assurance of lubrication of the proper points is not controllable, and such large quantities of lubricant have to be introduced into the operating air that even the points most difficult to lubricate will positively receive enough lubricant. This makes the lubricant content of the operating air so high that the drill machine is not able to utilize the whole lubricant, the greater portion thereof escaping together with the exhaust air from the drill and causing environment pollution. It is also obvious that an unnecessary amount of lubricant is consumed, which involves high costs.

Concerning the lubrication of a hydraulic rock drill, in which the actuating fluid is oil, the problem is that the oil which is appropriate to power the drill is not particularly suitable for use as lubricating oil.

SUMMARY OF THE INVENTION

The object of the present invention is to eliminate the drawbacks mentioned and to provide a lubrication system of the type initially mentioned wherein the lubricant can be conducted along pipes and bores expedient for lubrication and in themselves known in prior art, directly to the proper points of lubrication and in correct dosage.

This object is achieved by virtue of the characteristic features of the invention specified in the attached claims. The oil mist which is detrimental to health is then reduced to a fraction of what it was in the prior art, and less lubricant is consumed.

In the lubrication system according to the invention, by applying a lubricant dosage to lubricating points of the rock drill mechanism provides an unexpectedly favorable solution to a lubrication problem which has been a long felt need in rock drills for a long time. The results of the invention include not only the major work hygiene and economic advantages mentioned but also easy implementation, which is due to the fact that the recurrent dosing pulses required in lubrication systems operating according to the dosage principle of the invention already exist in rock drill apparatus, in the form of the feed and return motions of the rock drill relative to the drill frame.

In the following description a lubrication system according to an embodiment of the invention is more clearly described with reference to the attached drawing, wherein:

DETAILED DESCRIPTION OF THE PREFERRED EMBODIMENT

Figure 1:
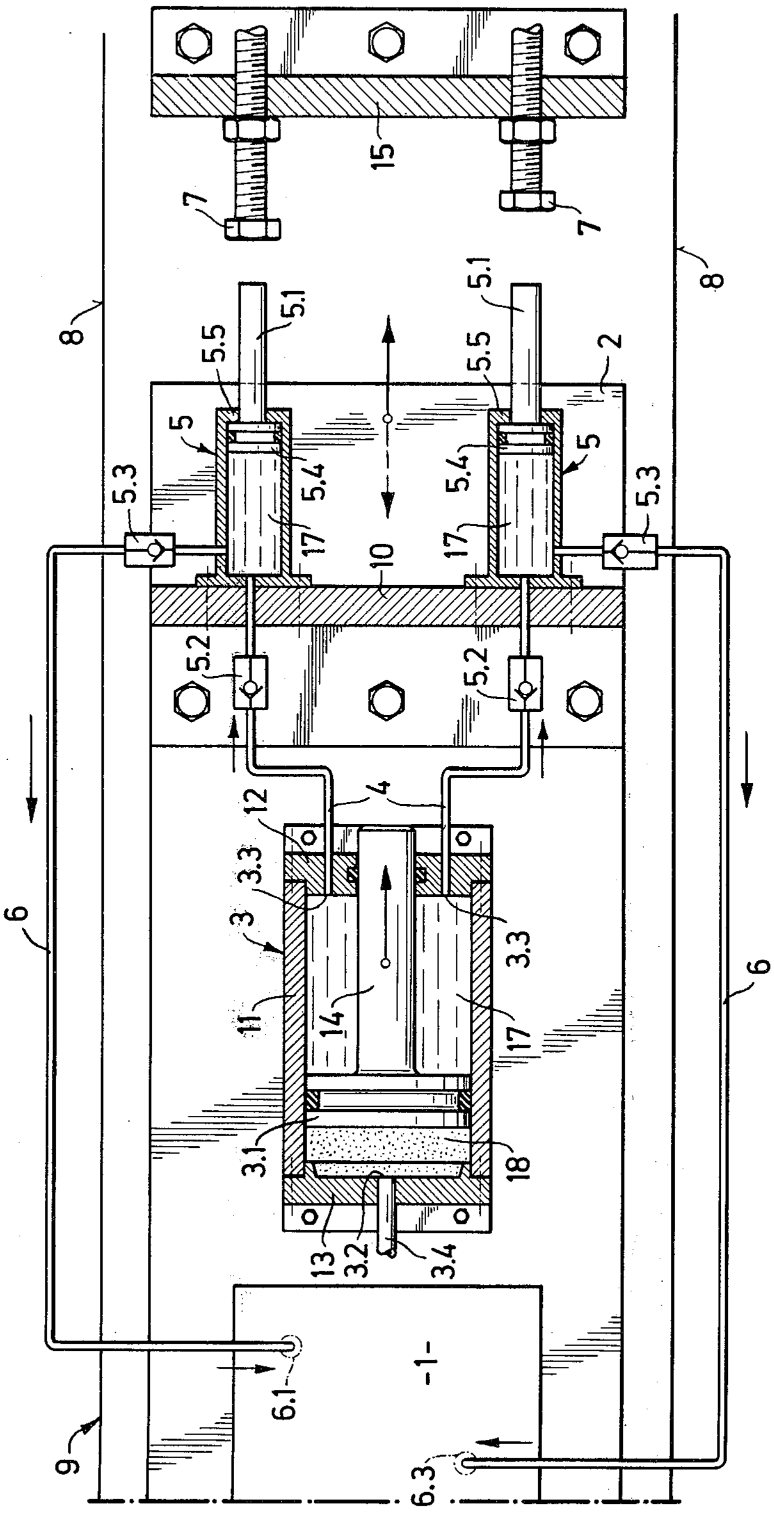
FIG. 1 is a schematic diagram of an apparatus according to the invention for providing lubricant to a pair of lubrication points, with portions shown in section along line I—I of FIG. 2.
Figure 2:
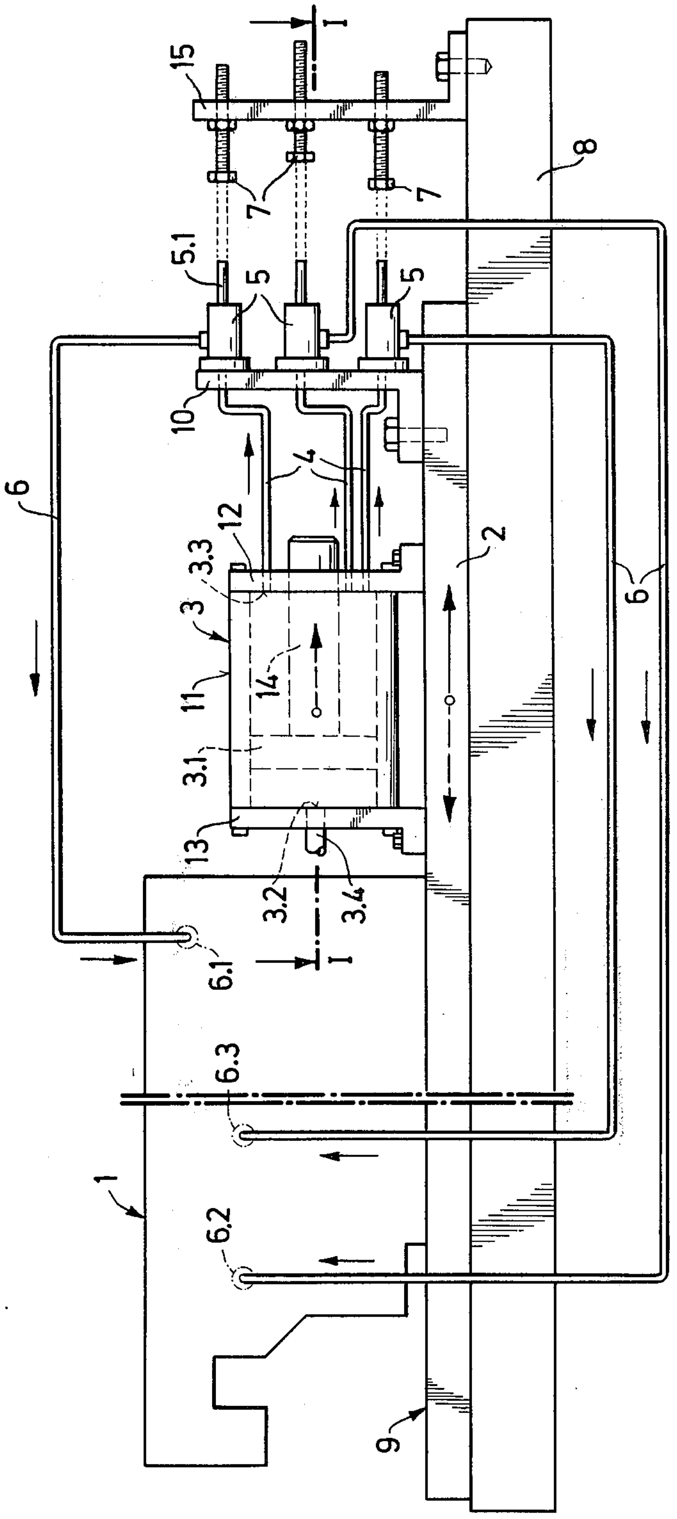
FIG. 2 is a schematic elevation view of the apparatus of FIG. 1.

Referring to FIGS. 1 and 2, a rock drill 1 is shown arranged to be reciprocably movable by means of a feed device 9 (FIG. 2). The rock drill 1 is mounted on a slide 2 moving on rails 8. A lubricant reservoir 3 is mounted in the vicinity of the feed device 9 from which lubricant is conducted by passages or conduits 4 to the dosage units 5. Each dosage unit 5 is connected by suitable passages or conduits 6 with its own lubricating points 6.1, 6.2, 6.3 in the rock drill 1. The dosage means 5 are preferably fastened on the slide 2 behind the rock drill 1, for instance on a console 10.

Figure 3:
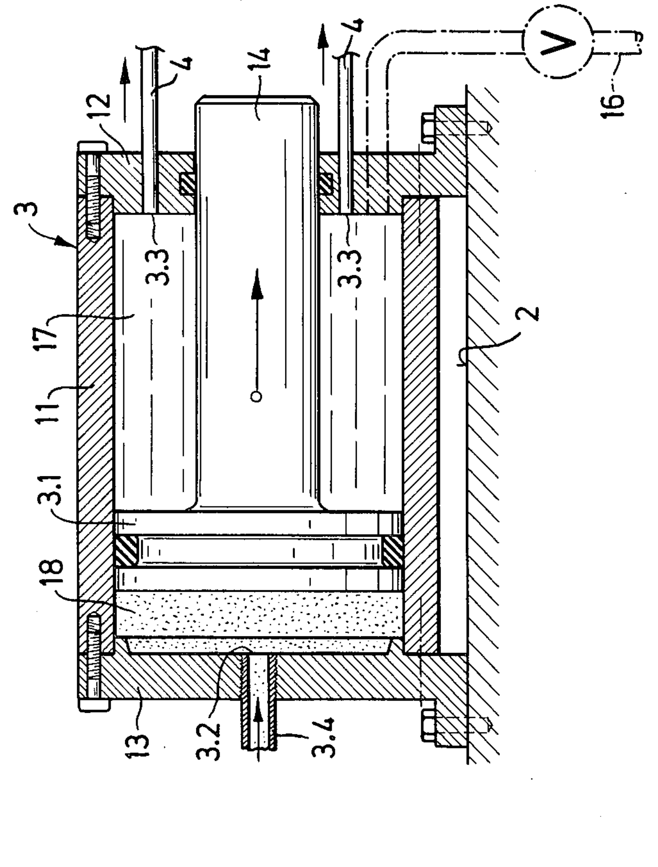
FIG. 3 is a detailed sectional view of the lubricant reservoir of the apparatus of FIGS. 1–2.

The lubricant reservoir, best shown at FIGS. 1 and 3, is illustrated as being piston-and-cylinder means 3 comprising a cylinder 11, a piston 3.1, end plates 12, 13, in which a pressurized fluid, e.g. compressed air 18, is applied to one side of the piston 3.1 through a port 3.2 via a conduit 3.4. The lubricant 17 contained on the other side of the piston 3.1 is fed through the apertures 3.3 in the end plate 12 to the dosage means 5 via the pipe 4. The piston 3.1 is guided in the end plate 12 by means of a piston rod 14.

Figure 4:
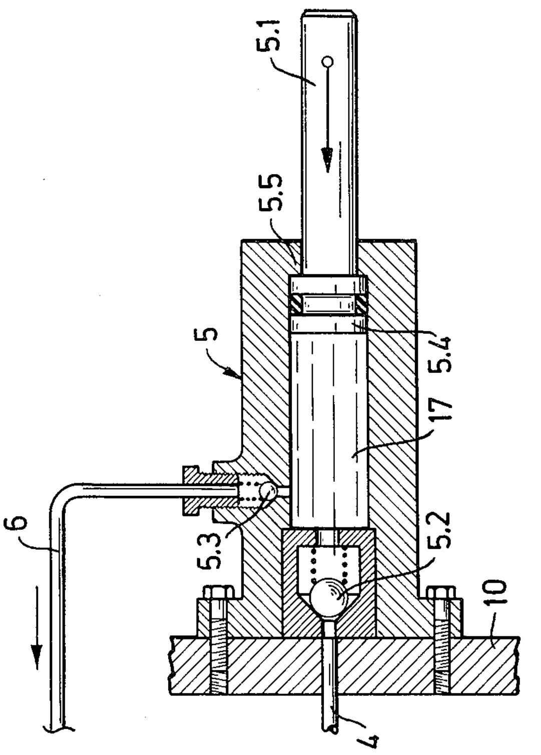
FIG. 4 is a detailed sectional view of the dosage means forming part of the system of FIGS. 1–2.

The dosage means, best shown in FIG. 4, is in the form of a piston-and-cylinder device 5, from which projects the piston rod 5.1 of the piston 5.4. From the lubricant reservoir 3 the lubricant is fed under pressure through the checkvalve 5.2 into the dosage means and pushes the dosage piston 5.4 into its extreme outer position against the stop 5.5, with the piston rod 5.1 projecting outwardly. When the rock drill 1 is returned to the start-of-drilling position on the rails (to the right in FIG. 2), which occurs every time after a given length of hole has been drilled, the end of the piston rods 5.1 of the dosage means meet the adjustable stops 7, whereby the pistons 5.1 expels lubricant from the dosage means 5 to the points of use 6.1, 6.2, etc. The start-of-drilling position is determined by the end stop (not depicted) of the slide 2. The stops 7 have been made in the shape of adjusting screws, by the aid of which the lubricant quantities to be dosed can be steplessly regulated. The stops 7 are advantageously placed at the rear end of the rails 8 serving the feed device 9 e.g. over a console 15. The valve 5.3 of the dosage means is so adjusted that it opens under a pressure exceeding the pressure in the lubricant reservoir 3. The lubricant reservoir 3 can be replenished by means of a conduit 16, arranged for instance in the end plate 12.

It will be readily apparent to those skilled in the art that the invention is not confined to the embodiment example presented in the foregoing and it may in structural respect vary in numerous ways, within the scope of the following claims.

We claim:

1. Lubrication system for rock drill machine operated by pressurized fluid, said rock drill machine comprising a rock drill unit mounted on a slide reciprocable by power feed means relative to stationary rail means, said lubrication system comprising a reservoir of lubricant, lubricant dosage means having an input connected to said reservoir of lubricant for receiving lubricant from said reservoir, conduit means connected between lubrication points on said machine and an output of said dosage means, and means for automatically and recurrently feeding an adjustable lubricant quantity into said conduit means upon reciprocation of said slide relative to said rail, each of said dosage means comprising a cylinder into which lubricant is fed from said reservoir, a piston reciprocable in said cylinder, and a piston rod attached to said piston, said piston rod being engageable with an abutment upon reciprocation of said slide.

2. The lubrication system of claim 1 wherein said dosage means are mounted on said slide supporting said rock drill.

3. The lubrication system of claim 1 wherein each of said dosage means is connected to a single lubrication point.

4. The lubrication system of claim 1 wherein each of said dosage means is connected to a plurality of lubrication points.

5. The lubrication system of claim 1 wherein said abutment means end is in the shape of an adjusting screw longitudinally adjustably engageable with the end of said piston rod.

6. The lubrication system of claim 1 wherein said reservoir of lubricant comprises a cylinder, a piston reciprocable in said cylinder, means for supplying lubricant to said cylinder on one side of said piston, and means for supplying compressed air to the other side of said piston.

7. The lubrication system of claim 1 wherein said dosage means are operated each time said rock drill is returned to a start-of-drilling position.

* * * * *